E. G. MERGENTHALER.
MACHINE FOR GRINDING, STROPPING, AND BOXING RAZOR BLADES.
APPLICATION FILED NOV. 12, 1912.
1,197,141.
Patented Sept. 5, 1916.
11 SHEETS—SHEET 1.
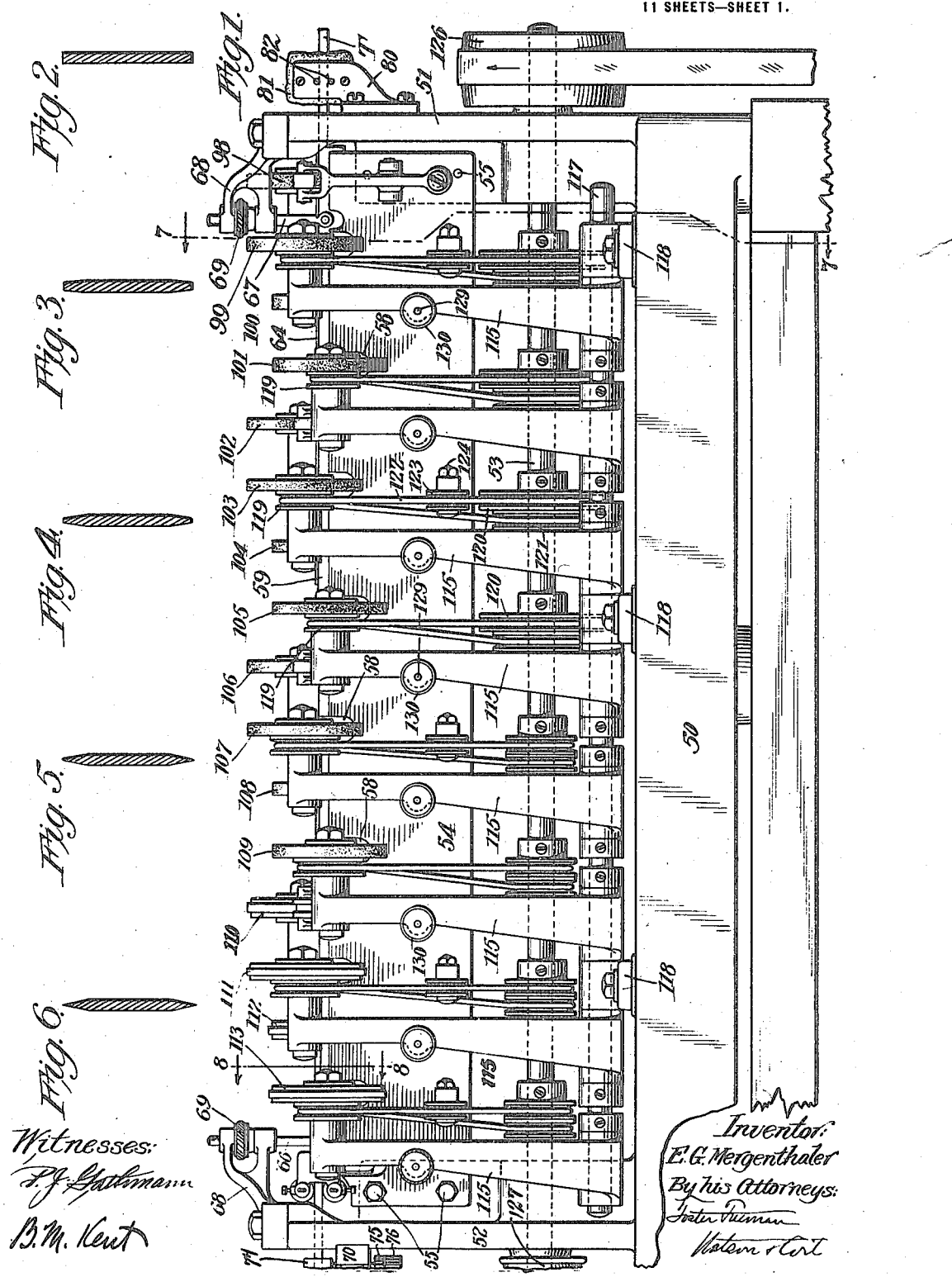
Witnesses:
F. J. Gothmann
B. M. Kent
Inventor:
E. G. Mergenthaler
By his Attorneys:
Foster Freeman
Watson & Coit

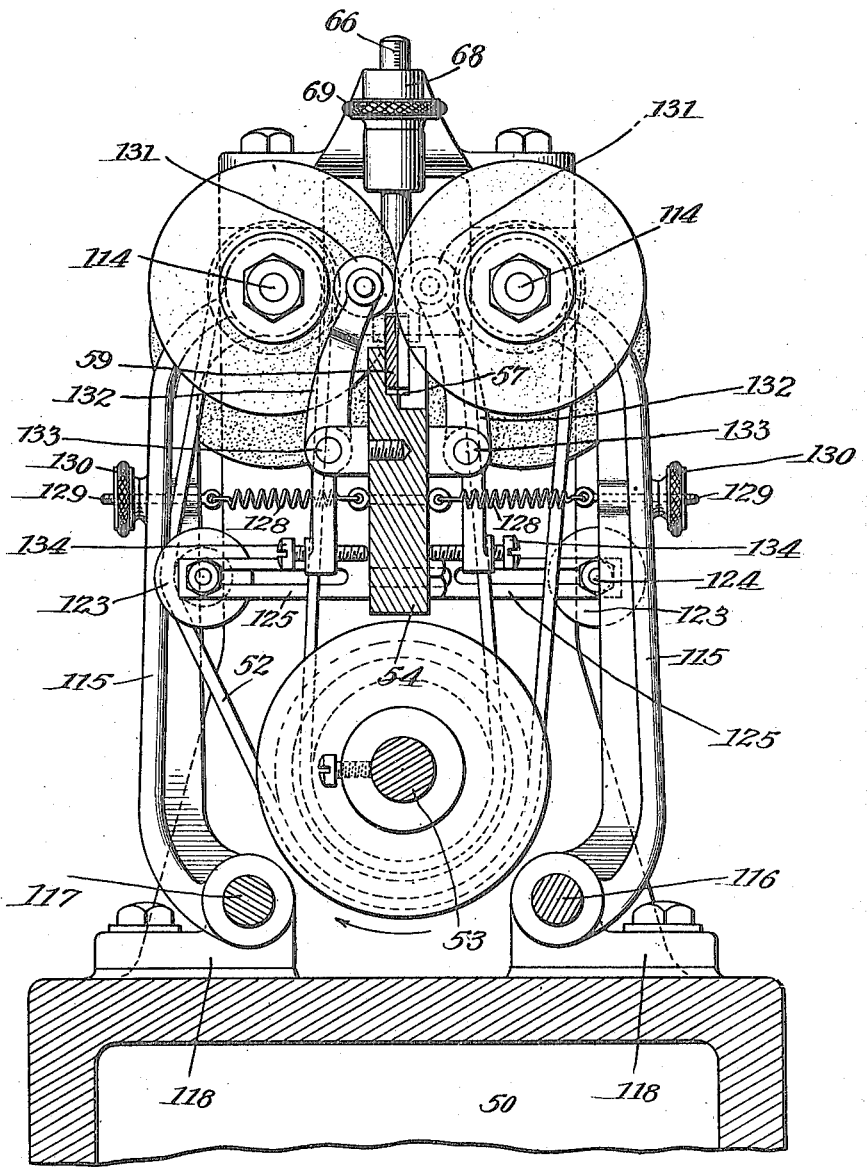

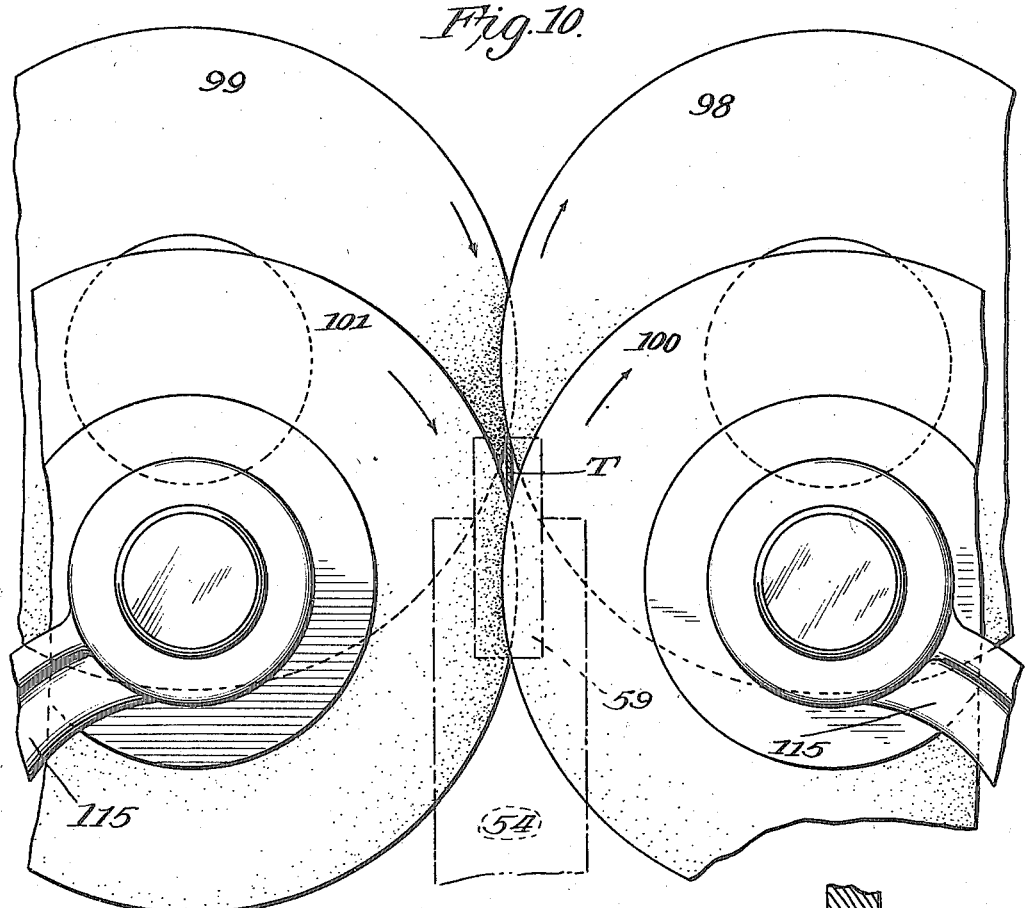
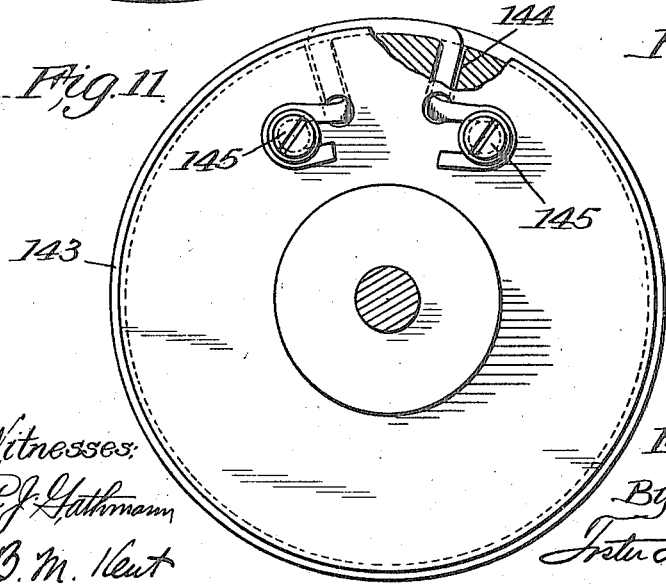
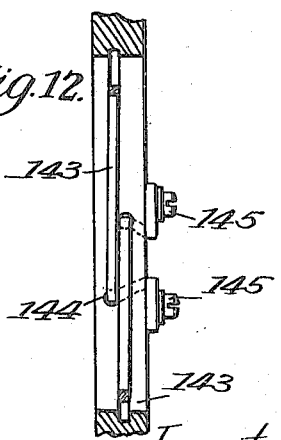

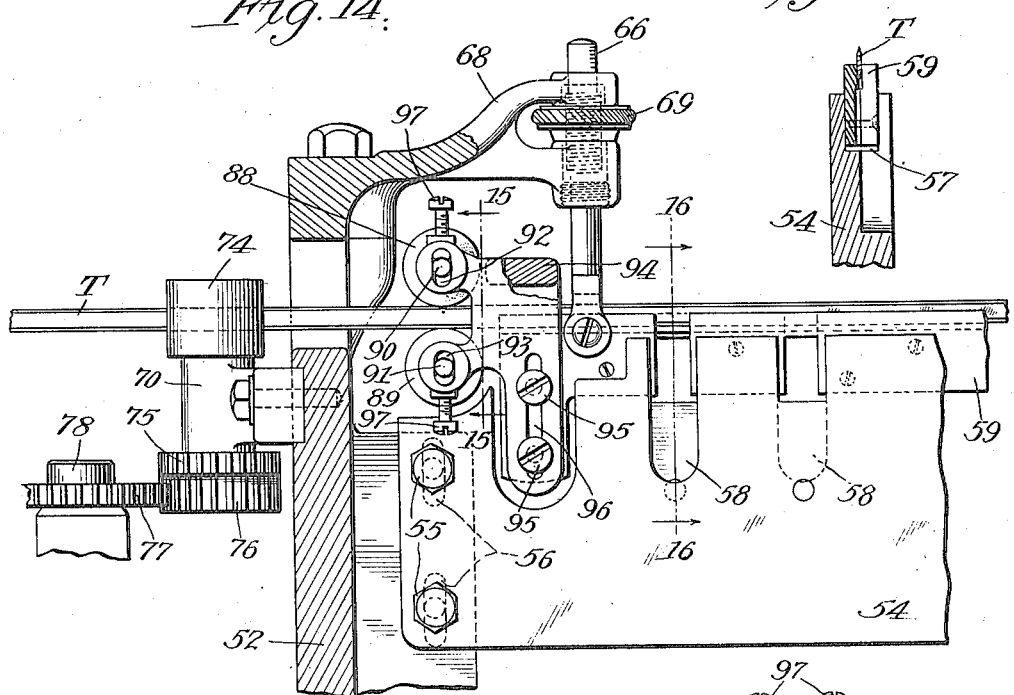
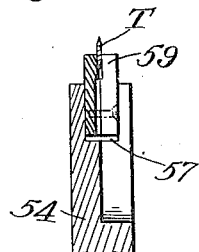
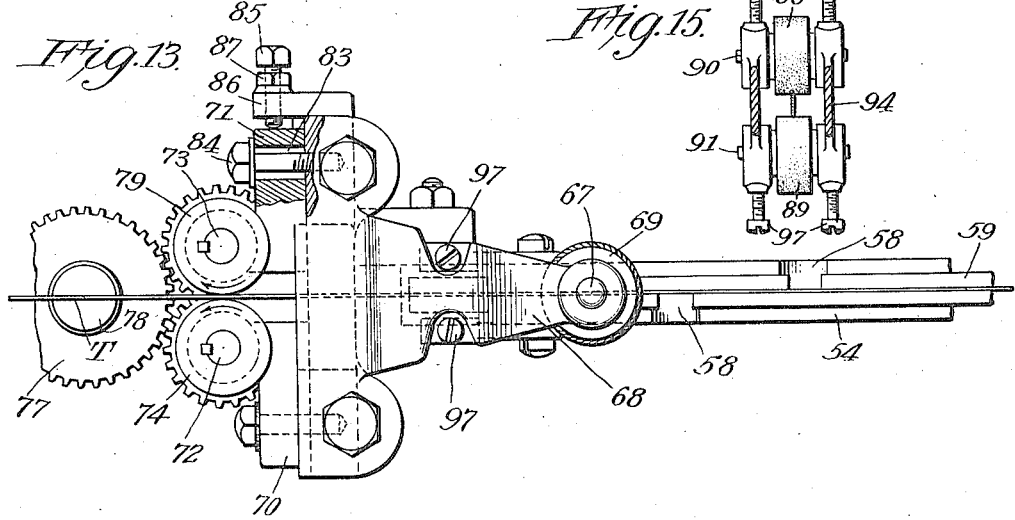

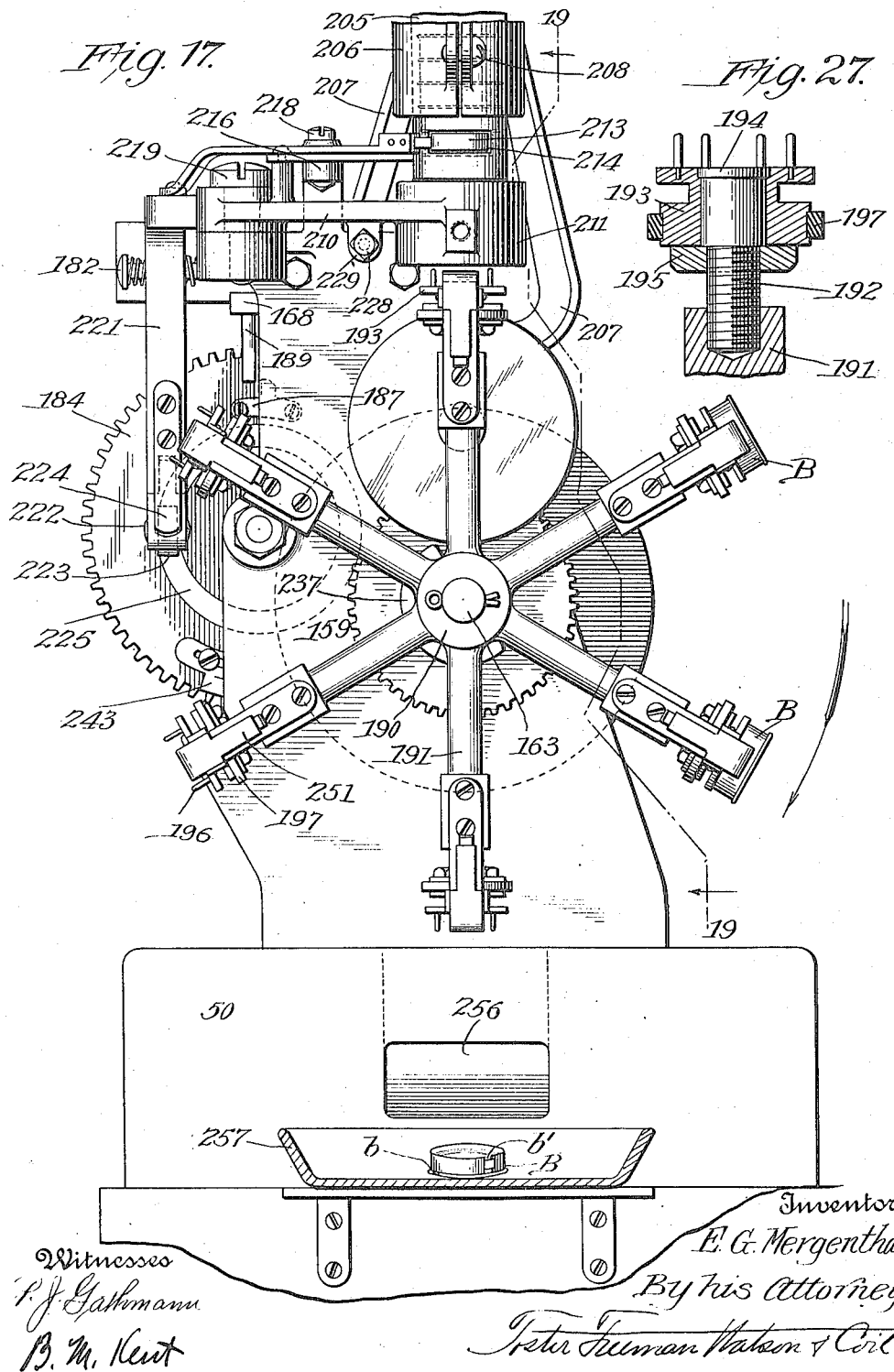

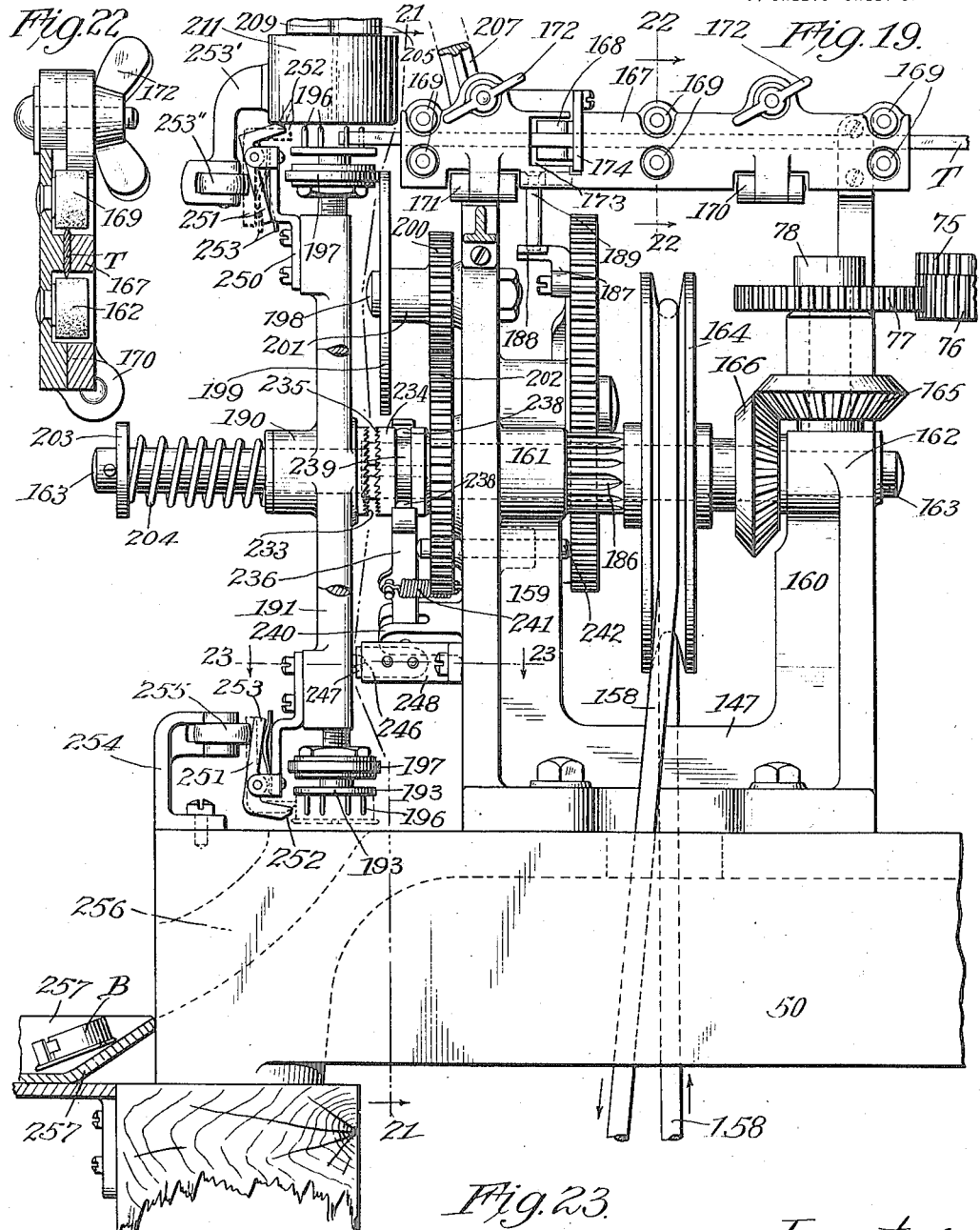

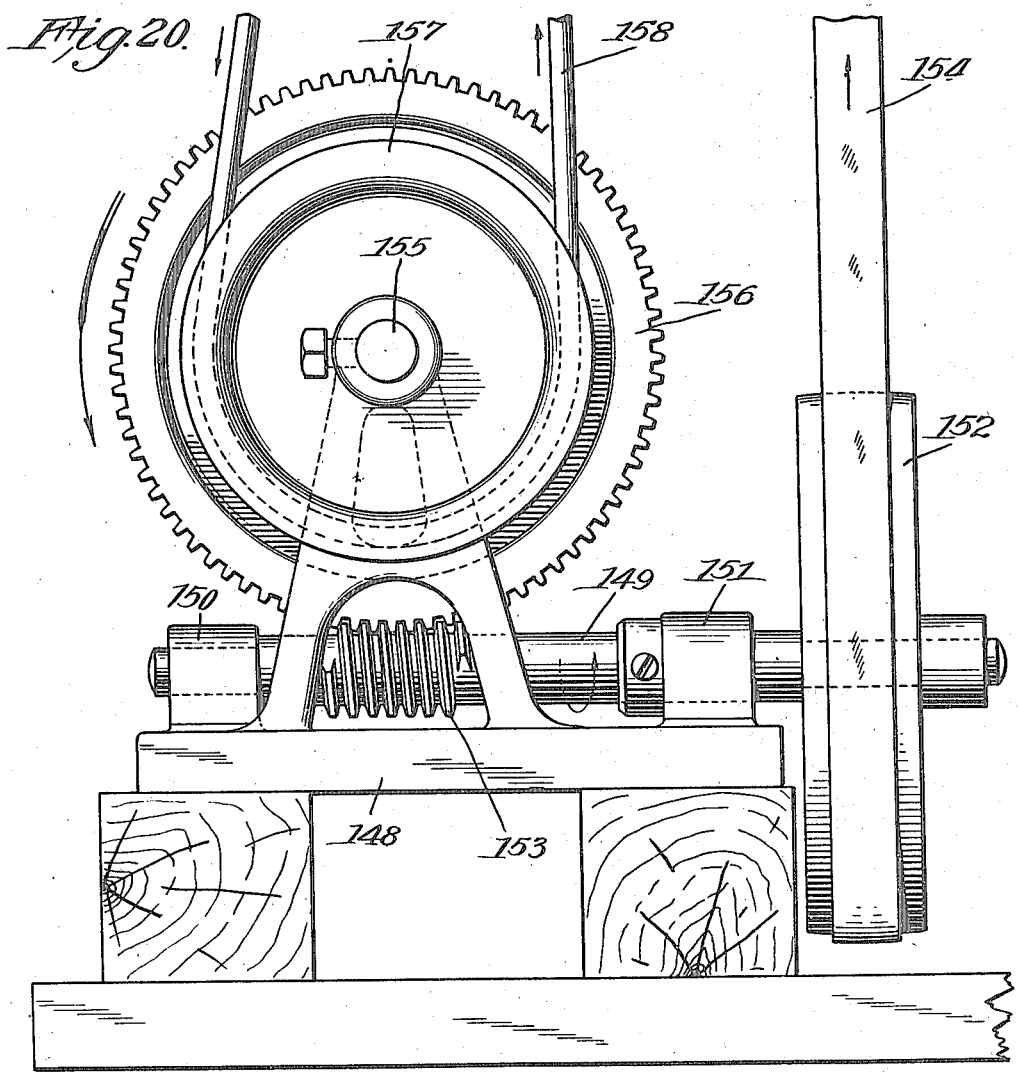

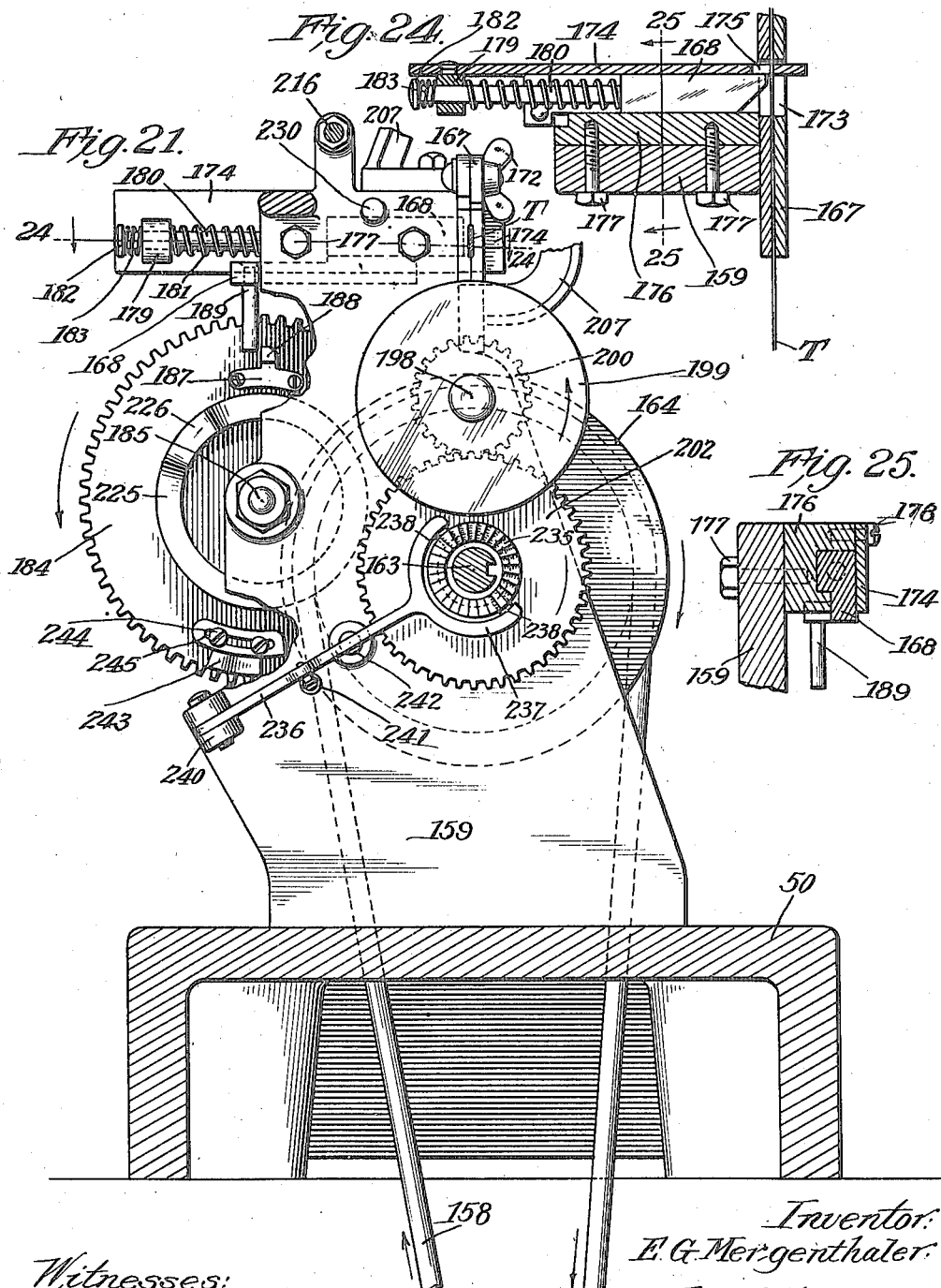

E. G. MERGENTHALER.
MACHINE FOR GRINDING, STROPPING, AND BOXING RAZOR BLADES.
APPLICATION FILED NOV. 12, 1912.
1,197,141.
Patented Sept. 5, 1916.
11 SHEETS—SHEET 11.
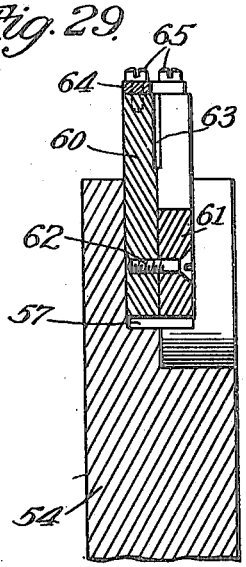
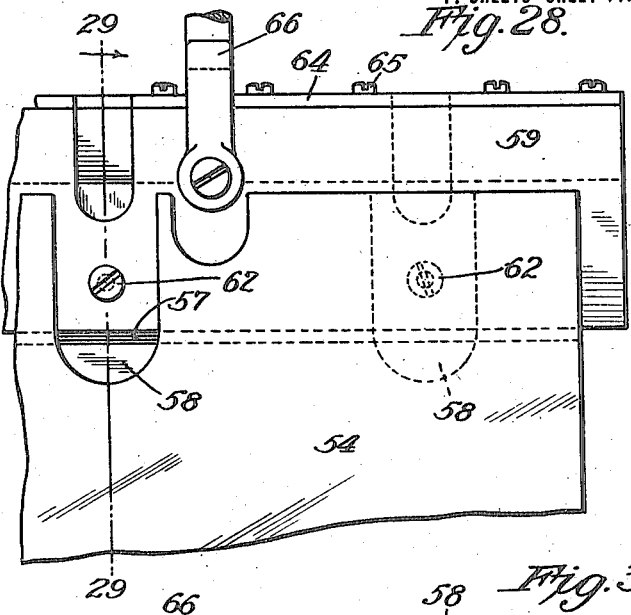
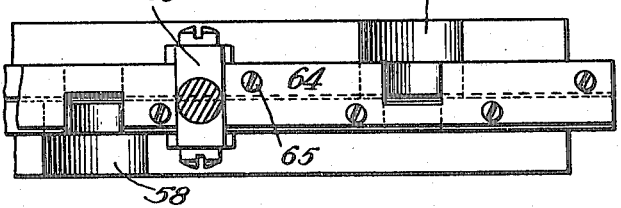
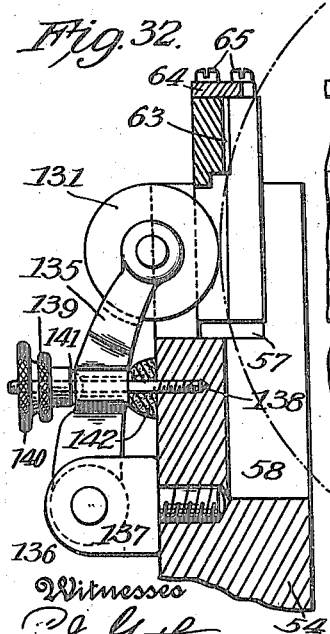
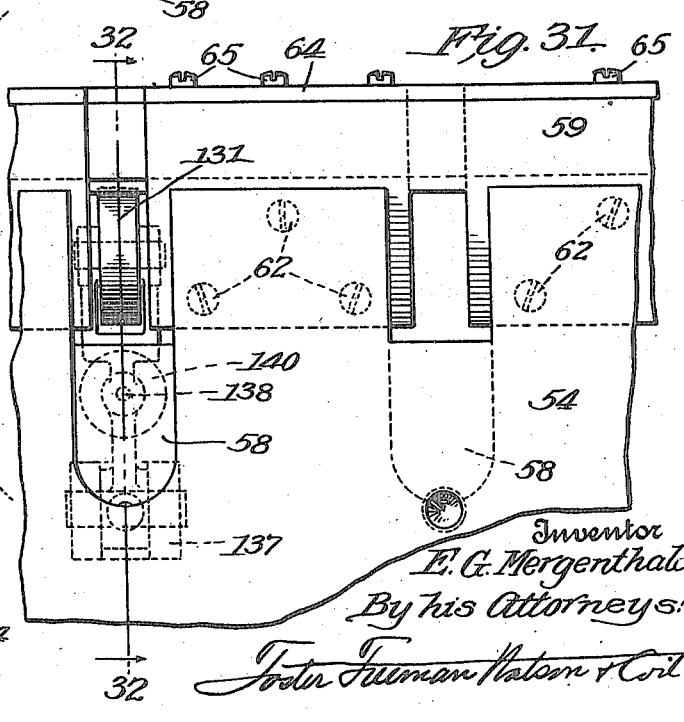
Inventor
E. G. Mergenthaler
By his Attorneys
Foster Freeman Watson & Coit
Witnesses
P. J. Gathmann
B. M. Kent

UNITED STATES PATENT OFFICE.

EUGENE G. MERGENTHALER, OF BALTIMORE, MARYLAND.

MACHINE FOR GRINDING, STROPPING, AND BOXING RAZOR-BLADES.

1,197,141.                     Specification of Letters Patent.           Patented Sept. 5, 1916.

Application filed November 12, 1912. Serial No. 730,981.

*To all whom it may concern:*

Be it known that I, EUGENE G. MERGENTHALER, a citizen of the United States, residing at Baltimore city, Maryland, have invented certain new and useful Improvements in Machines for Grinding, Stropping, and Boxing Razor-Blades, of which the following is a specification.

This invention relates to grinding machines and more particularly to machines adapted to grind and strop the edge of a steel tape for the purpose of making blades for safety razors.

One of the objects of the invention is to provide an improved machine for grinding and stropping the edges of a tape in which the grinding and stropping wheels are held in fixed relation to the tape, by means which automatically advance the wheels toward the tape as they wear.

Another object is to provide a machine of this class having improved means for supporting and feeding the tape.

Other objects are to provide, in connection with a grinding and stropping mechanism, mechanism for automatically cutting the tape into uniform lengths and for coiling the lengths and placing the same in suitable containers.

Figure 8:
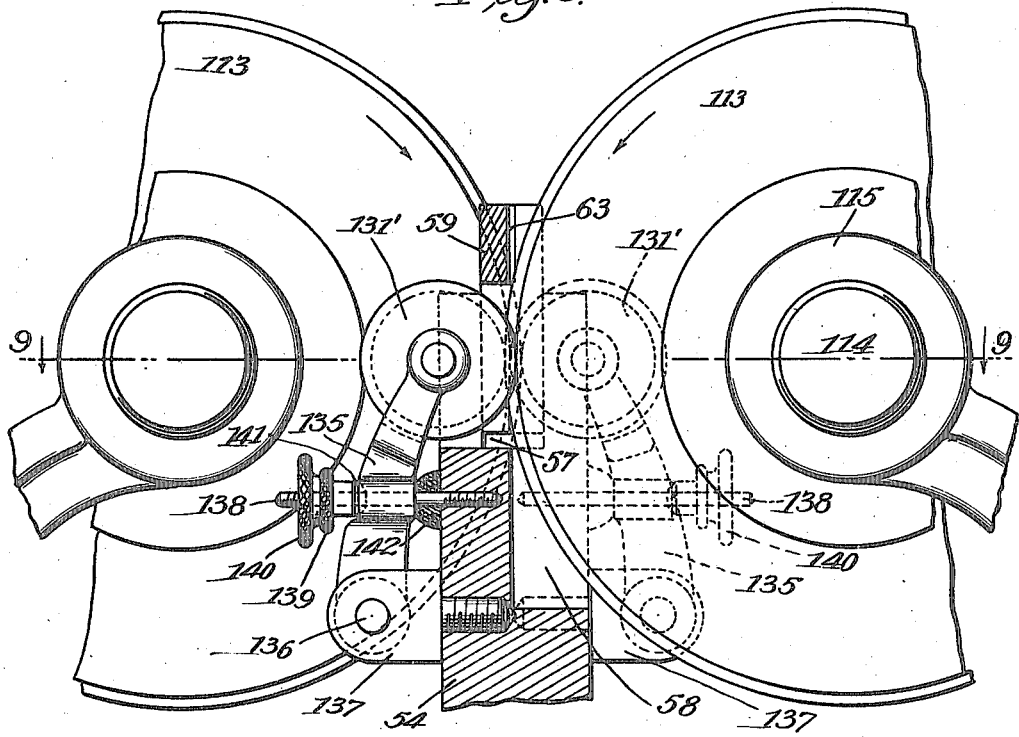
Figure 9:
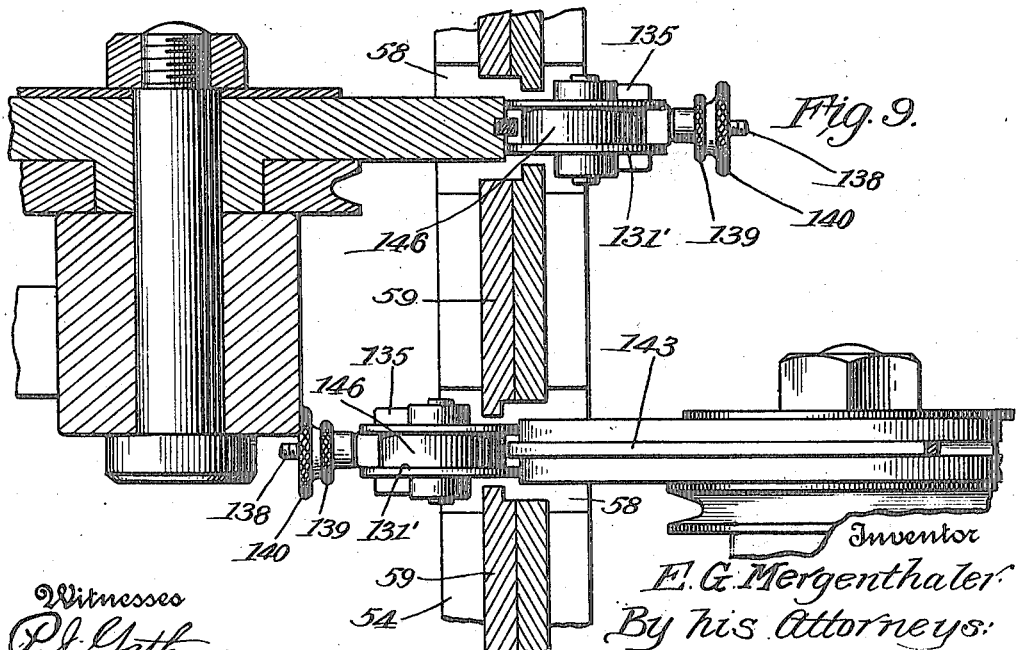
Figure 18:
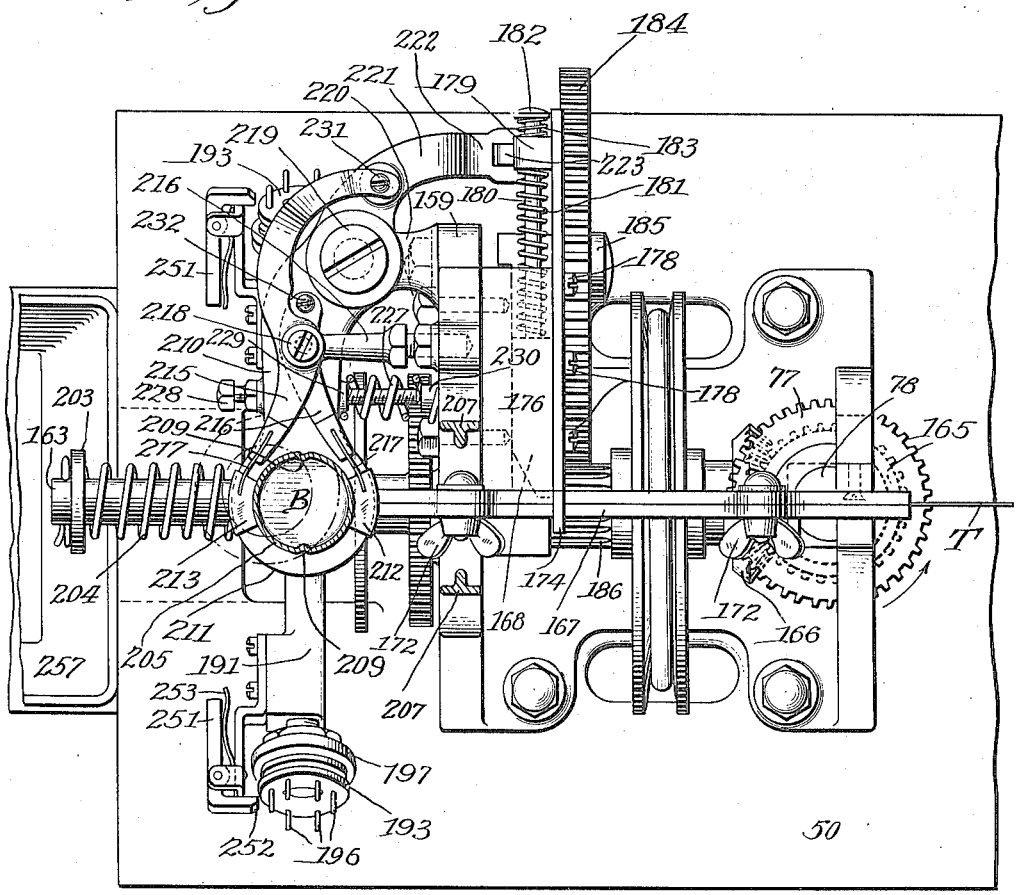
Figure 26:
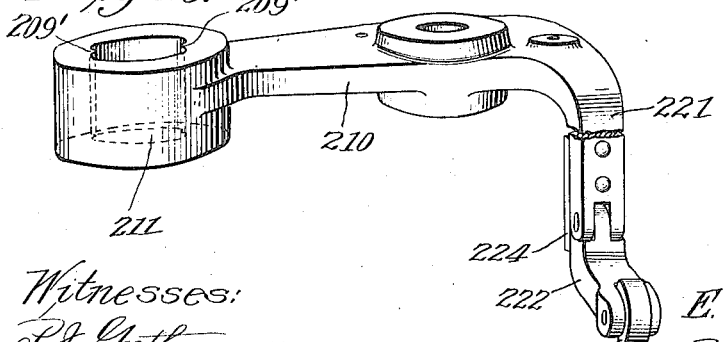

The novel features of the invention will be apparent from the following description taken in connection with the accompanying drawings, in which:

Figure 1 is a side elevation of the grinding and stropping mechanism. Figs. 2 to 6 are enlarged cross sectional views of the tape and are arranged directly above Fig. 1 to show the various steps of the grinding and stropping operation as the tape moves through the machine. Fig. 7 is a transverse section on the line 7—7 of Fig. 1. Fig. 8 is a transverse section on the line 8—8 of Fig. 1. Fig. 9 is a section on the line 9—9 of Fig. 8 with certain parts shown in elevation. Fig. 10 is a diagrammatic view showing the arrangement of the grinding wheels whereby both sides of both edges of the tape are ground simultaneously. Fig. 11 is a detail view of one of the stropping wheels. Fig. 12 shows a development of a portion of the circumference of the stropping wheel shown in Fig. 11. Fig. 13 is an enlarged plan view of the feeding mechanism shown at the left hand end of Fig. 1, certain parts being broken away. Fig. 14 is a side elevation of the feeding mechanism shown in Fig. 13, certain parts being shown in section. Fig. 15 is a transverse section on the line 15—15 of Fig. 14. Fig. 16 is a transverse section on the line 16—16 of Fig. 14. Fig. 17 is an end elevation of the mechanism for cutting off and boxing the sharpened blades. Fig. 18 is a plan view of the mechanism shown in Fig. 17. Fig. 19 is a longitudinal section on the line 19—19 of Fig. 17. Fig. 20 is an elevation of the driving means for the cutting off and boxing mechanism. Fig. 21 is a section on the line 21—21 of Fig. 19. Fig. 22 is an enlarged transverse section on the line 22—22 of Fig. 19. Fig. 23 is a section on line 23—23 of Fig. 19. Fig. 24 is a horizontal section through the cutting off mechanism. Fig. 25 is a section on the line 25—25 of Fig. 24. Fig. 26 is a perspective view of a detail of the box or container feeding mechanism. Fig. 27 is an enlarged transverse section through one of the reels. Fig. 28 is an enlarged elevation of a portion of the guide for the tape. Fig. 29 is a section on the line 29—29 of Fig. 28. Fig. 30 is a plan view of the parts shown in Fig. 28. Fig. 31 is an enlarged elevation of another portion of the tape guide. Fig. 32 is a section on the line 32—32 of Fig. 31.

Referring to the drawings it will be observed that the machine comprises the grinding and stropping portions shown in Fig. 1 and the cutting off and boxing mechanisms shown in Fig. 19. It should be noted that the parts shown in Fig. 19 are arranged at the left hand end of Fig. 1, the tape passing from the stropping mechanism shown in Fig. 1 directly to the cutting off mechanism.

The grinding and stropping mechanism consists of a frame 50 provided with the upright brackets 51 and 52 which support the driving shaft 53 and a beam 54, the latter extending longitudinally of the machine. The beam 54 is secured to the brackets 51 and 52 in any suitable manner as by bolts 55 and the brackets are provided with elongated slots 56 (see Fig. 14) to receive the bolts and permit the beam 54 to be adjusted vertically. The upper edge of the beam is provided with a rectangular longitudinally extending slot 57 and a plurality of spaced pockets or recesses 58 for the grinding and stropping wheels.

A lateral supporting and guiding member 110

59 is arranged in the slot 57. The member 59 is made up of two series of blocks 60 and 61 with the ends of the blocks of each series spaced apart to provide pockets for the grinding wheels and with the blocks of one series staggered in relation to those of the other and secured together by suitable screws 62 so as to form a rigid member. The upper portions of the adjoining faces of the blocks are recessed to provide a slot 63 extending longitudinally of the member 59 and in which is arranged the tape, this slot being of just sufficient size to permit the tape to pass freely therethrough and at the same time support the tape laterally so that it will be held against the grinding wheels. Along a portion of the upper edge of the member 59 is arranged a cover plate 64 for the recess 63, this cover plate being secured to the blocks by means of screws 65 and thereby giving additional rigidity to the member 59. The member 59 is adjustably supported in the slot 57 by means of hangers 66 and 67 which have their upper ends screw-threaded and arranged in brackets 68 secured to the brackets 51 and 52. Adjusting nuts 69 engage the threaded portions of the hangers 67 and are arranged between spaced arms on the brackets 68 and held thereby against movement axially of the hangers, whereby the hangers are caused to be moved vertically by turning the nuts 69.

The bracket 52 has secured thereto brackets 70 and 71 (see Figs. 13 and 14) which carry the vertical shafts 72 and 73 respectively. The shaft 72 carries at its upper end a feed roller 74 and at its lower end a gear 75, by means of which it is driven, this gear meshing with a gear 76 on the lower end of the shaft 73 and the latter gear meshing with a driving gear 77 on an upright shaft 78. The upper end of the shaft 73 carries a feed roller 79 which coöperates with the roller 74 to draw the tape T through the machine in the direction of the arrow.

The bracket 51 carries a bracket 80 which supports the wiping material 81, the latter surrounding the tape T and frictionally engaging the same, whereby it acts as tension means to hold the tape taut between the bracket 80 and the feed rolls 74 and 79. The bracket 80 also carries guide pins 82 between which the tape T passes. Any suitable means may be employed for varying the friction of the wiping material 81 on the tape T and the friction of the rolls 74 and 79 on the tape may be varied by adjusting the position of the bracket 71. For this latter purpose I have arranged a slot 83 in the bracket 71 and provided a bolt 84 which passes through this slot and clamps the bracket 71 against the bracket 52. An adjusting screw 85 is arranged in an arm 86 carried by the bracket 52 and engages the end of the bracket 71. By means of this screw the bracket 71 may be forced in the direction of the tape T for the purpose of causing the rolls to more tightly press against the tape. The screw 85 may be locked in any adjusted position by means of the nut lock 87.

It will thus be seen that the tape between the tension and wiping means 81 and the feed rolls 74 and 79 is held taut in the slot 63 and in order to prevent the tape from shifting vertically the slot 63 at the entrance end of the machine is of just sufficient depth to permit the tape to move freely therethrough. In other words the distance between the bottom of the slot and the cover plate 64 is but slightly greater than the width of the tape, as is clearly shown in Fig. 7. In order to prevent the tape from shifting vertically at the opposite end of the machine I have provided, adjacent the bracket 52 a pair of guide rolls 88 and 89, these rolls having spindles 90 and 91, respectively, which are arranged in vertical slots 92 and 93 in arms carried by a bracket 94 and adjustably secured to the end of the member 59 by means of bolts 95 which pass through a slot 96 in the bracket. The rolls 88 and 89 may be individually adjusted to and from the tape by means of the screws 97 and the rolls with the tape may be adjusted vertically relative to the member 59 by loosening the screws 95 and moving the bracket 94. As will be clearly seen from the drawings the rolls 88 and 89 engage the sharpened edges of the tape and in order to prevent them from dulling these edges the rolls are made of a very pliable material, such as soft rubber.

From Fig. 1 it will be observed that the plate 64 on the member 59 extends to a point about midway between the brackets 51 and 52 and from this point the tape gradually rises in the slot 63 until the upper edge of the tape is entirely above the slot, as shown in Fig. 14.

The grinding of the edges of the tape is accomplished by means of a plurality of sets of grinding wheels, each set comprising a pair of wheels operating on opposite sides of the upper edge of the tape and a corresponding pair of wheels operating on opposite sides of the lower edge of the tape. As shown in Fig. 1 I employ three such sets of grinding wheels, but it will be understood that this number may be increased or diminished as desired.

The tape, as received by the machine, is rectangular in cross section, as shown in Fig. 2, and a pair of grinding wheels 98 and 99, which are arranged on opposite sides of the tape adjacent the bracket 51, grind the upper edge of the tape, as the latter passes these wheels, to the form shown in the upper part of Fig. 3. A corresponding pair of wheels 100 and 101 operate on the lower edge of the tape and grind it in a similar manner, as is also shown in Fig. 3. The wheels 98, 99, 100 and 101 thus constitute one set which performs one of the steps in the grinding operation.

A second set of grinding wheels comprising the upper wheels 102 and 103 and the lower wheels 104 and 105 grind the edges of the tape to the form shown in Fig. 4. A third set comprising the upper wheels 106 and 107 and the lower wheels 108 and 109 complete the grinding operation and sharpen the edges of the tape to the form shown in Fig. 5.

Beyond the third set of grinding wheels is arranged a set of stropping wheels, comprising the upper wheels 110, 111 and the lower wheels 112 and 113, which finish the edges of the tape.

Each of the grinding and stropping wheels is mounted on a separate stub shaft or pin 114 and each pin is carried by a separate arm 115. The arms for the wheels on one side of the tape are pivoted to a rod 116 and the arms for the wheels on the opposite side of the tape are pivoted to a rod 117, these rods extending longitudinally of the machine and being supported in suitable bearings 118.

Each of the grinding and stropping wheels has secured thereto a pulley 119, the pulleys of each pair of upper and lower wheels, forming each set, being substantially in alinement with each other and also with a driving pulley 120 for the pair, on the shaft 53. Arranged alongside of each of the pulleys 120 is an idler pulley 121 and an endless belt 122 is arranged to run over the pulleys of each pair of driving wheels and the driving pulley therefor and also the idler pulley, the belt being so directed as to give the proper direction of rotation to the grinding wheels.

Referring to Fig. 10 it will be observed that I have indicated by arrows the direction of rotation of each of the wheels of a set and have also shown the arrangement of the wheels whereby they coöperate to simultaneously sharpen both edges of the tape. In order to provide the proper tension in the belts I have arranged idler pulleys 123 in position to engage each of the belts, these pulleys being arranged on stub shafts 124, which are adjustably mounted on brackets 125 carried by the beam 54. The shaft 53 has arranged at one end thereof the driving pulley 126, by means of which it is continuously rotated, and at the opposite end a pulley 127 for a purpose to be described hereinafter.

In order to press the grinding and stropping wheels against the tape I have provided the springs 128, these springs having one end thereof attached to the beam 54 and the other end connected with eye bolts 129 which pass through the arms 115 and are provided on the exterior of said arms with adjustable nuts 130 by means of which the tension of the springs may be varied.

For the purpose of holding the grinding and stropping wheels in definite relation to the tape I have provided the rollers 131 which engage the peripheries of the wheels at points adjacent the tape. These wheels are preferably made of an extremely hard wear-resisting material and are mounted on suitable adjustable arms, whereby the wheels are positioned to hold the grinding wheels in proper relation to the tape. As shown in Fig. 7 the wheels 131 are carried by arms 132 which are pivoted at 133 to suitable brackets secured to the beam 54. The arms 132 extend below the pivots 133 and have arranged therein adjustable screws 134, the ends of which engage the sides of the beam 54 and thereby limit the movement of the wheels 131 outwardly under the influence of the springs 128. Other means may be employed for the purpose of holding the wheels 131 in position. For example, in Figs. 8, 9, 31 and 32 I have illustrated another means for this purpose comprising an arm 135 which is pivoted at 136 to a bracket 137 secured to the beam 54. A bolt 138 has one end secured to the beam 54 and passes loosely through the arm 135 and is provided exteriorly of the arm with an adjustable nut 139 which may be locked in position by a lock nut 140. The nut 139 is provided with a hemispherical inner end 141 which engages a suitable recess in the arm 135, and a buffer 142 of rubber or other suitable material is arranged between the inner side of the arm 135 and the beam 54 to press the arm outwardly.

The grinding wheels are of the usual construction and are made of suitable abrasive material. The stropping wheels are, however, of special construction, (see Figs. 11 and 12) these wheels being provided with a helical groove in their periphery and in this groove is laid a strip of stropping leather 143, the ends of which are overlapped, as shown in Fig. 12, and extend radially through suitable openings 144 in the wheels and are secured by any suitable fastening means, such as the screws 145, as shown in Fig. 11. In order not to have the wheels 131', which coöperate with the stropping wheels, engage the stropping leather 143, the wheels 131' are provided with peripheral grooves 146, as shown in Fig. 9, these grooves permitting the marginal portions of the wheels to engage the peripheries of the stropping wheels.

The frame 50 extends beyond the bracket 52 and supports a bracket 147 which carries the cutting off and boxing mechanisms. Arranged below the bracket 147 and the frame 50 is a frame 148, which is suitably supported and carries a shaft 149, in bearings 130

150 and 151, having arranged thereon a pulley 152 and a worm or screw 153. The pulley 152 is driven by means of a belt 154 from the pulley 127 (shown in Fig. 1). The frame 148 also supports a shaft 155 which has arranged thereon a worm gear 156, meshing with the worm 153, and a pulley 157 having arranged thereon a belt 158. The direction of rotation of the shafts 149 and 155 and the direction of movement of the belts 154 and 158 are indicated on the drawing by the arrows.

The bracket 147 is provided with the spaced upwardly extending arms 159 and 160 having bearings 161 and 162, respectively, for the shaft 163. The shaft 163 carries a pulley 164 between the arms 159 and 160, this pulley being driven by means of the belt 158, as shown in Figs. 19 and 21. The arm 160 is also provided with bearings for the upright shaft 78, which is driven by means of a pair of bevel gears 165 and 166, the gear 166 being arranged on the shaft 163.

For the purpose of cutting the tape into lengths after it has been sharpened I have provided a cutting mechanism which comprises the tape guide 167 and the cutting plunger or die 168. The guide 167 is supported on the arms 159 and 160, as shown in Fig. 19, and a plurality of sets of guide rollers 169 of yieldable material are carried by one side of the guide and engage the edges of the tape to support the latter. The sides of the guide 167 are hinged together by hinges 170 and 171 and secured by means of suitable clamps or bolts 172. An opening 173 is provided in the guide and a shear plate or die 174 is arranged transversely of the guide in said opening, this plate being provided with an opening 175 through which the tape runs. As will be observed from Fig. 24 one of the lateral edges of the opening 175 coöperates with the plunger 168 to shear the tape. The plunger 168 is arranged in a guide block 176 which is secured to an upward extension of the arm 159 by means of bolts 177. The plate 174 is secured to the block 176 by suitable screws or bolts 178 and has secured thereto an abutment 179, through which extends a rod 180 secured to the plunger 168. A spring 181 is coiled around the rod 180 and engages the plunger 168, and the abutment 179 and tends to force the plunger away from the abutment. The outer end of the rod 180 is provided with a head 182, between which and the abutment 179 is a buffer spring 183. The springs 181 and 183 normally hold the end of the plunger 168 just out of contact with the tape.

For the purpose of actuating the plunger 168 I have mounted a gear wheel 184 on a stub shaft 185 carried by the arm 159, this gear meshing with a pinion 186 on the shaft 163 so that the gear 184 is continuously rotated in definite speed relation to the shaft 163. The gear 184 has secured thereto a block 187 having a laterally projecting arm 188 adapted to engage the downwardly projecting pin 189 carried by the plunger 168, as the wheel revolves, and thereby draw the plunger away from the tape. This operation will be readily understood from Fig. 21, wherein the direction of rotation of the gear 184 is indicated by an arrow, and it will be seen that when the plunger 168 has been withdrawn a certain distance the arm 188 will become disengaged from the pin 189 and the spring 181, having been compressed by the movement of the plunger, will force the plunger against the tape, the plunger striking a sharp blow which will instantly sever the tape. As the plunger strikes the tape the spring 183 will come into action as a buffer and restore the plunger to its normal inoperative position.

In the drawings I have indicated but one block 187 on the wheel 184, but it will be obvious that an additional number of blocks may be employed when desired for the purpose of cutting the tape at more frequent intervals. Since the gear 184 is driven at a definite speed relative to the feed rolls 74 and 79 it will be obvious that the plunger will be actuated at regular intervals to cut the tape into uniform lengths. It will also be obvious that the lengths of the cut sections may be varied by changing the proportions of the gears and by changing the number of actuating arms 188 on the gear 184.

The sections of the tape cut off are suitably coiled and placed in boxes or containers. For this purpose I have arranged on the shaft 163 a spider 190 having a plurality of radially extending arms 191, at the extremities of which are mounted the coiling mechanisms.

Before describing in detail the mechanism for coiling the sections of tape and placing the same in the boxes I will describe generally the mode of operation of this mechanism.

The boxes are in the form of a short circular cylinder open at one end and closed at the other end and provided with a radially extending flange at its closed end. One of these boxes is shown at B in the lower part of Fig. 17, and a series of the boxes is shown in dotted lines in the upper part of this figure. The end of the tape is received in the coiling mechanism and coiled up as it is fed through the machine. Immediately before the tape is severed, a box, the open end of which is arranged downwardly, is dropped over the coil so that when the tape is severed the coil expands within the box and draws the end through a suitable slot formed in the side of the box. Immediately thereafter the coiling mechanism with the box thereon is moved away from the position it occupied during the coiling operation and another coiling mechanism is moved into this position and receives the new end of the tape and forms a new coil, these operations being continued indefinitely. The coiling mechanisms carry the boxes with them, as indicated in Fig. 17, and when they reach a certain position the boxes with coils therein are discharged from the coiling mechanisms into a suitable receptacle.

As shown in Fig. 17 the spider 190 is provided with six radial arms, each of which carries a coiling mechanism comprising, as shown in Fig. 27, a pin 192, which is secured to the end of the arm 191 in any suitable manner as by being screwed into a threaded opening therein, and a reel or disk 193 rotatably arranged on this pin and held against axial movement thereon by the shoulder 194 and the collar 195. The outer face of the disk 193 is provided with a series of axially projecting pins 196, on which the tape is coiled, and on the periphery of the disk is preferably arranged a tire 197 of suitable friction material, such as rubber or fiber.

The arm 159 of the bracket 147 carries a stub shaft 198, on which are rotatably arranged the friction disk 199 and the gear wheel 200, which are connected together by means of the hub 201. The gear 200 meshes with a gear 202 secured on the shaft 163 so that the friction disk 199 rotates in definite relation to the feed rolls 74 and 79, and also to the speed of the tape.

The shaft 163 carries an abutment 203, (see Fig. 19) and a spring 204 is arranged between this abutment and the hub of the spider 190 and forces the spider away from said abutment so that the tire 197 of one of the disks 193 is held against the friction wheel 199 when said disk is in its operative or coiling position. It will thus be seen that the disk will be rotated by the friction wheel in definite relation to the speed of the tape. As the end of the tape approaches the coiling device it passes between two of the pins 196 and the end of the tape will be frictionally held by these pins so as to cause the tape to be wrapped around the pins as the disk revolves. As before stated the speed of rotation of the disk corresponds to the speed of the tape so that the tape will be coiled without difficulty. Immediately before the plunger 168 is actuated, to cut the tape a box or container is dropped from a magazine over the pins 196. This magazine is shown at 205 (Figs. 17 to 19) and consists of a tube which is clamped in the split collar 206, the latter being supported on the arm 159 by means of suitable brackets 207.

In operating the machine the tubes 205 may be loaded with empty boxes and whenever a magazine is exhausted it may be removed, by releasing the clamping screw 208, and a loaded magazine inserted. The magazines may be of any desired length.

Referring to the illustration of one of the boxes in Fig. 17 it will be observed that the radially extending flange at the closed end of the box is provided with a notch $b$. The box is also provided with a similar notch in this flange on the opposite side from the one shown. The side wall of the box is provided with a slot $b'$, extending practically the full height thereof and when the box is dropped over the coiling disk or reel the tape enters this slot. The boxes are provided with the notches $b$ above described for the purpose of accurately determining the position of the slot $b'$, these notches engaging suitable ribs 209 in the magazine (see Figs. 18 and 19.)

For the purpose of dropping the boxes onto the reels I have provided a swinging arm 210 having a hollow cylindrical member 211 at its outer end through which the boxes are adapted to pass, this member being provided on its interior with ribs 209' registering with the ribs 209 of the magazine. The cylindrical member 211 has a movement from the position shown in full lines in Fig. 18 to that shown in dotted lines. As will be readily understood when the member 211 is in the position shown in full lines in Fig. 18 there is a free passage for the box downwardly to the reel 193 and when the member 211 is in the position shown in dotted lines this passage is closed and the lowest box in the magazine rests on the upper surface of the member 211. For the purpose of dropping the boxes one at a time I have provided a pair of grippers 212 and 213 which are adapted to engage the second lowest box in the magazine, as indicated in Fig. 17, suitable openings 214 being provided in the magazine to permit the grippers to engage the box. The grippers are carried by tongs which comprise the members 215 and 216, being connected therewith by leaf springs 217. The members 215 and 216 are arranged on a pivot 218 carried by a bracket 216 on the arm 159.

The swinging arm 210 is mounted on a pivot 219 carried by a bracket 220, on the arm 159 and has a portion thereof extending beyond said pivot and bent downwardly to form an arm 221, to the lower end of which is pivoted a member 222 carrying a cam roller 223, the member 222 extending laterally of the arm 221 and being held in position by a comparatively heavy leaf spring 224 which is riveted, or otherwise secured to the arm 221.

The wheel 184 carries a cam track 225, having a raised portion 226, and the cam 180 roller 223 engages this cam track as indicated in Fig. 17. As the gear 184 revolves the raised portion 226 of the cam track 225 causes the arm 210 to be swung to and from the position of registration of the member 211 with the magazine. For the purpose of moving the arm 210 in the opposite direction from which it is moved by the raised portion 226 of the cam track I have provided a spring 227, which surrounds an adjustable screw 228 and presses against a lug 229, on the arm 210, and the upper part of the arm 159. In order to stop the arm 210 in the exact position where the opening through the member 211 registers with the magazine 205 the end of the screw 228 engages an abutment 230 on the arm 159, the spring 224 yielding sufficiently to take up any additional movement of the cam roller 223 caused by the raised portion 226 of the cam track.

In order to grip the second lowest box in the magazine for the purpose of preventing all but the lowest box from dropping through the opening in the member 211 I have arranged to actuate the grippers 212 and 213 in unison with the movements of the arm 210 and for this purpose the member 215 has a rearward extension which is bent around the pivot 219 and pivoted to the upper part of the arm 221, as indicated at 231. The member 216 is likewise provided with a rearward extension which is pivoted to the arm 210, as indicated at 232 so that when the arm 210 is swung to the position to drop a box the grippers 212 and 213 will be caused to engage the second lowest box and support the entire column of boxes with the exception of the lowest box which falls through the opening in the member 211 into the reel 193. As the arm 210 moves in the opposite direction the grippers 212 and 213 are released and the boxes in the magazine drop so that the lowest box rests upon the upper surface of the member 211. As before stated the movement of the arm 210 to drop a box onto the reel occurs just prior to the actuation of the plunger 168.

The expansion of the coil of tape within the box, after the cutting operation, causes the rearward end of the tape to be drawn into the box through the opening $b'$ in the side thereof. The spider 190 is then rotated to place an empty reel in position to receive the new end of the tape. The rotation of the spider 190 is accomplished in the following manner: The inner side of the hub of the spider is provided with the jaws 233, and a collar 234, which is splined onto the shaft 163, is provided with jaws 235 adapted to engage the jaws 233. A lever 236 having a forked end 237 provided with trunnions 238 which engage a suitable groove 239 in the collar 234, is pivoted to a bracket 240 supported by the arm 159. A spring 241 has one end connected with the lever 236 and its other end connected with the arm 159 and normally tends to draw the lever and the collar 234 away from the spider 190. A push rod 242, which is slidably arranged in the arm 159, has one end in engagement with the lever 236 and its other end in engagement with the side of the wheel 184 in the path of a cam 243, which is secured to the gear by means of screws 244, the cam being provided with a slot 245 permitting adjustment thereof circumferentially of the gear. When the cam 243 strikes the push rod 242 the latter is moved axially and shifts the collar 234 into engagement with the spider 190, causing the latter to rotate with shaft 163. The movement of the collar 234 is such that the spider 190 is shifted axially toward the abutment 203, in order to disengage the reel 193 from the friction disk 199. In thus moving the spider axially the spring 204 is compressed and by the time the cam 243 has passed the push rod the spider has been rotated a sufficient amount to bring the next reel into position. The disengagement of the cam 243 from the push rod permits the spring 241 to draw the lever 236 and the collar 243 inwardly and disengage the jaws 235 from the jaws 233, thereby permitting the rotation of the spider to be interrupted. As the collar 234 is moved inwardly the spring 204 pushes the spider in the same direction and causes the tire 197 of the reel 193 to engage the friction wheel 199 to rotate the reel. In order to stop the spider with the reel in the proper position to receive the tape and coil the same I have arranged on the inner side of each of the arms 191 a pin or stop 246 which is adapted to engage a spring 247 supported by a bracket 248, from the arm 159. The spring 247 is preferably provided with an indentation 249 which engages the stop 246 when the reel is in the exact position required to receive and coil the tape.

In order to hold the boxes on the reels and to discharge them at the proper point I have arranged on each of the arms 191 a bracket 250 having pivoted thereto a member 251, the end 252 of which is adapted to be pressed against the side of the box by a spring 253. The member 251 thus holds the box in position while the arm carrying the same travels from the coiling position where the reel 193 is vertically above the shaft 163, to the diametrically opposite position where the wheel is vertically below the shaft 163, as shown in Figs. 17 and 19. In order to move the member 251 to a position where it will not interfere with the dropping of the box the member 211 is provided with a downwardly curved arm 253, having at its lower end a contact roller 253'', which is adapted to engage the lower end of the member 251 when the member 211 is moved to the position to drop the box. The engagement of the arm 253' with the member 251 moves the end 252 of the latter away from the reel 193, as will be readily understood from Fig. 19.

In order to release the box when the reel reaches its lowermost position I have mounted on the frame 50 a bracket 254 which carries a roller 255 adapted to engage the member 251 for the purpose of disengaging the end 252 thereof from the box and permitting the latter to drop from the reel 193 into the passage 256 from which it is discharged into the receptacle 257.

The operation of the various parts of the machine having been described in connection with the description of the details of construction, it is believed that a complete description of the operation of the machine would be superfluous and therefore the same has been omitted.

It will be understood that the various mechanisms shown and described herein are merely illustrative of my invention and therefore I do not wish to be limited to these exact details, it being understood that I claim as my invention all constructions which come within the scope of the appended claims.

Having thus described the invention what is claimed as new is:

1. In a machine of the class described, the combination of means for supporting the work, a grinding wheel adapted to operate on the work, spring means for holding the said wheel against the work and for moving the wheel toward the work, as the wheel wears, and a member engaging the surface of said wheel and adapted to maintain the contacting portion of the wheel in substantially fixed relation to the work.

2. In a machine of the class described, the combination of means for supporting the work, a grinding wheel adapted to operate on the work, spring means for holding said wheel against the work and for moving the wheel toward the work, as the wheel wears, and an adjustable member engaging the surface of said wheel and adapted to maintain the contacting portion of the wheel in substantially fixed relation to the work.

3. In a machine of the class described, the combination of means for supporting the work, a grinding wheel adapted to operate on the work, spring means for holding said wheel against the work and for moving the wheel toward the work, as the wheel wears, and a rigidly supported roller engaging the surface of said wheel and adapted to maintain the contacting portion of the wheel in substantially fixed relation to the work.

4. In a machine of the class described, the combination of means for supporting the work, a grinding wheel adapted to operate on the work, spring means for holding said wheel against the work and for moving the wheel toward the work, as the wheel wears, a pivotally mounted arm, a roller carried by said arm and engaging the surface of said wheel and adapted to maintain the contacting portion of the wheel in substantially fixed relation to the work, and an adjusting screw for fixing the position of said roller.

5. In a machine of the class described, the combination of means for feeding a tape through the machine, tension means for the tape, a grinding wheel adapted to operate on the tape, spring means for holding said wheel against the tape and for moving the wheel toward the tape, as the wheel wears, and a member engaging the surface of said wheel and adapted to maintain the contact portion of the wheel in substantially fixed relation to the tape.

6. In a machine of the class described, the combination of a member adapted to support a tape, feeding means adapted to draw the tape through said member, tension means engaging the tape at the entrance end of said member, a grinding wheel adapted to operate on said tape as it moves through said member, means for holding said wheel in contact with the tape and for moving the wheel toward the tape as the wheel wears, means for limiting the movement of said wheel toward the tape, and means for adjusting the position of said member transversely of the tape.

7. In a machine of the class described, the combination of a member adapted to support a tape, feeding means adapted to draw the tape through said member, tension means engaging the tape at the entrance end of said member, a grinding wheel supported independently of said member and adapted to operate on said tape as it moves through said member, means for holding said wheel in contact with the tape and for moving the wheel toward the tape, as the wheel wears, and means carried by said member for limiting the movement of said wheel toward the tape.

8. In a machine of the class described, the combination of a supporting frame, a member carried by said frame and adapted to support a tape, feeding means adapted to draw the tape through said member, tension means engaging the tape at the entrance end of said member, an arm pivoted to said supporting frame, a grinding wheel carried by said arm and adapted to operate on said tape as it moves through said member, a spring coöperating with said arm and said member to hold said wheel against the tape and move the wheel toward the tape, as the wheel wears, and means for limiting the movement of said wheel toward the tape.

9. In a machine of the class described, the combination of a supporting frame, a member carried by said frame, and adapted to support a tape, feeding means adapted to draw the tape through said member, tension means engaging the tape at the entrance end of said member, an arm pivoted to said supporting frame, a grinding wheel carried by said arm and adapted to operate on said tape as it moves through said member, a spring coöperating with said arm and said member to hold said wheel against the tape and move the wheel toward the tape, as the wheel wears, a member for limiting the movement of said wheel toward the tape, and means for adjusting the position of said member transversely of the tape.

10. In a machine of the class described, the combination of a supporting frame, a member carried by said frame and adapted to support a tape, feeding means adapted to draw the tape through said member, tension means engaging the tape at the entrance end of said member, a plurality of independently movable arms carried by said supporting frame, grinding wheels on each of said arms adapted to operate on said tape as it moves through said member, means for holding said wheels in contact with the tape and for moving the wheels toward the tape as they wear, means for limiting the movement of said wheels toward the tape, and means for adjusting the position of said member transversely of the tape.

11. In a machine of the class described, the combination of a supporting frame, a member carried by said frame and adapted to support a tape, feeding means for drawing the tape through said member, tension means engaging the tape at the entrance end of said member, a plurality of independently movable arms on said frame, grinding wheels carried by said arms and adapted to operate on said tape as it moves through said member, independently adjustable springs engaging said arms and adapted to hold said wheels in contact with the tape and move the wheels toward the tape as they wear, and means for limiting the movement of said wheels toward the tape.

12. In a machine of the class described, the combination of a supporting frame, a member carried by said frame and adapted to support a tape, feeding means for drawing the tape through said member, tension means engaging the tape at the entrance end of said member, a plurality of arms arranged on opposite sides of said member and pivoted to said frame, grinding wheels carried by said arms and adapted to operate on the tape as it moves through said member, means for holding said wheels in contact with the tape and for moving wheels toward the tape as they wear, and means for limiting the movement of said wheels toward the tape.

13. In a machine of the class described, the combination of a supporting frame, a member carried by said frame and adapted to support a tape, feeding means for drawing the tape through said member, tension means engaging the tape at the entrance end of said member, a purality of arms arranged on opposite sides of said member and pivoted to said frame, grinding wheels carried by said arms and adapted to operate on the tape as it moves through said member, means for holding said wheels in contact with the tape and for moving the wheels toward the tape as they wear, means for limiting the movement of said wheels toward the tape, and means for adjusting the position of said member transversely of the tape.

14. In a machine of the class described, the combination of means for supporting the work, a driving wheel, a pair of grinding wheels arranged on opposite sides of the work and adapted to be moved to and from the same, and means whereby said grinding wheels are rotating in opposite directions by said driving wheel.

15. In a machine of the class described, the combination of means for supporting the work, a driving shaft, a plurality of driving wheels thereon, and a plurality of pairs of grinding wheels adapted to operate on the work, each pair of grinding wheels being driven by one of said driving wheels.

16. In a machine of the class described, the combination of means for supporting the work, a driving shaft, a plurality of driving wheels thereon, means for feeding the work through the machine, a plurality of pairs of grinding wheels adapted to operate on the work, each pair of grinding wheels being driven by one of said driving wheels, and means for automatically advancing the grinding wheels toward the work as they wear.

17. In a machine of the class described, the combination of means for feeding a tape through the machine, a plurality of grinding wheels arranged to successively operate on one of the edges of the tape to sharpen the same, and a stropping wheel arranged to operate on said edge after said grinding wheels.

18. In a machine of the class described, the combination of means for feeding a tape through the machine, a plurality of grinding wheels arranged on opposite sides of the tape and adapted to successively operate on one of the edges thereof to sharpen the same, and a pair of stropping wheels arranged on opposite sides of the tape.

19. In a machine of the class described, the combination of means for feeding a tape through the machine, a plurality of grinding wheels arranged to successively operate on one of the edges of the tape to sharpen the same, a stropping wheel arranged to operate on said edge after said grinding wheels, and spring means for holding said wheels in operative relation to the tape.

20. In a machine of the class described, the combination of means for feeding a tape through the machine, a plurality of grinding wheels arranged to successively operate on one of the edges of the tape to sharpen the same, a stropping wheel arranged to operate on said edge after said grinding wheels, and means for maintaining contacting portions of said wheels in fixed relation to the tape.

21. In a machine of the class described, the combination of means for feeding tape through the machine, a plurality of grinding wheels arranged to successively operate on one of the edges of the tape to sharpen the same, a stropping wheel arranged to operate on said edge after said grinding wheels, and adjustable means for maintaining the contacting portions of said wheels in fixed relation to the tape.

22. In a machine of the class described, the combination of means for feeding a tape through the machine, a plurality of grinding wheels arranged to successively operate on one of the edges of the tape to sharpen the same, a stropping wheel arranged to operate on said edge after said grinding wheels, spring means for holding said wheels in operative relation to the tape, and means for fixing the position of said wheels relative to the tape and for moving the wheels in opposition to said spring means.

23. In a machine of the class described, the combination of means for feeding a tape through the machine, a plurality of grinding wheels arranged to successively operate on one of the edges of the tape to sharpen the same, a stropping wheel arranged to operate on said edge after said grinding wheels, and independent spring means for maintaining the contacting portion of each of the wheels in fixed relation to the tape.

24. In a machine of the class described, the combination of means for feeding a tape through the machine, a plurality of grinding wheels arranged to successively operate on one of the edges of the tape to sharpen the same, a stropping wheel arranged to operate on said edge after said grinding wheels, spring means for holding said wheels in operative relation to said tape, and independently adjustable means for fixing the position of each of the wheels relative to the tape and for moving the wheels in opposition to said spring means.

25. In a machine of the class described, the combination of tape feeding means, a plurality of grinding wheels arranged to operate on the tape, lateral supporting means whereby the tape is held against said wheels, and a guide roller of yielding material engaging the edge of the tape.

26. In a machine of the class described, the combination of tape feeding means, a plurality of grinding wheels arranged to operate on the tape to sharpen both edges thereof, lateral supporting means whereby the tape is held against said wheels, and guide rollers of yielding material engaging the sharpened edges of the tape.

27. In a machine of the class described, the combination of tape feeding means adapted to draw the tape through the machine horizontally, with the edges of the tape in a substantially vertical plane, a plurality of grinding wheels arranged at the side of the tape and adapted to operate on the edge thereof, lateral supporting means whereby the tape is held against said wheels, and a guide roller of yielding material engaging the edge of the tape.

28. In a machine of the class described, the combination of tape feeding means adapted to draw the tape through the machine horizontally, with the edges of the tape in a substantially vertical plane, a plurality of grinding wheels adapted to sharpen one of the edges of the tape, and a guide roller engaging said sharpened edge.

29. In a machine of the class described, the combination of tape feeding means adapted to draw the tape through the machine horizontally, with the edges of the tape in a substantially vertical plane, a plurality of grinding wheels adapted to sharpen both edges of the tape, and guide rollers engaging the sharpened edges of the tape.

30. In a machine of the class described, the combination of tape feeding means, a plurality of grinding wheels arranged to operate on the tape, lateral supporting means whereby the tape is held against said wheels, a guide roller of yielding material engaging the edge of the tape, and means for adjusting said roller to vary the position of the tape relative to the grinding wheels.

31. In a machine of the class described, the combination of tape feeding means, a plurality of grinding wheels arranged to operate on the tape to sharpen both edges thereof, lateral supporting means whereby the tape is held against said wheels, guide rollers of yielding material engaging the sharpened edges of the tape, and means for adjusting said rollers to vary the position of the tape relative to the grinding wheels.

32. In a machine of the class described, the combination of tape feeding means, a plurality of grinding wheels arranged to operate on the tape, adjustable lateral supporting means whereby the tape is held against said wheels, and a guide roller of yielding material carried by said supporting means and engaging the edge of the tape.

33. In a machine of the class described, the combination of tape feeding means, a plurality of grinding wheels arranged to operate on the tape to sharpen both edges thereof, adjustable lateral supporting means whereby the tape is held against said wheels, and guide rollers of yielding material carried by said supporting means and engaging the sharpened edges of the tape.

34. In a machine of the class described, the combination of tape feeding means adapted to draw the tape through the machine horizontally, with the edges of the tape in a substantially vertical plane, a plurality of grinding wheels arranged at the side of the tape and adapted to operate on the edge thereof, vertical adjustable lateral supporting means whereby the tape is held against said wheels, and a guide roller of yielding material carried by said supporting means and engaging the edge of the tape.

35. In a machine of the class described, the combination of tape feeding means adapted to draw the tape through the machine horizontally with the edges of the tape in a substantially vertical plane, a plurality of grinding wheels arranged at the side of the tape and adapted to operate on the same to sharpen both edges thereof, vertically adjustable lateral supporting means whereby the tape is held against said wheels, and guide rollers of yielding material carried by said supporting means and engaging the sharpened edges of the tape.

36. In a machine of the class described, the combination of tape feeding means adapted to draw the tape through the machine horizontally with the edges of the tape in a substantially vertical plane, a plurality of grinding wheels arranged at the side of the tape and adapted to operate on the same to sharpen both edges thereof, lateral supporting means whereby the tape is held against said wheels, and independently adjustable guide rollers of yielding material carried by said supporting means and engaging the sharpened edges of the tape.

37. In a machine of the class described, the combination of tape feeding means, a grinding wheel adapted to operate on the tape as it moves through the machine, and means for automatically and uniformly cutting the tape into lengths.

38. In a machine of the class described, the combination of tape feeding means, a plurality of grinding wheels coöperating to sharpen one edge of the tape as it moves through the machine, and means for automatically and uniformly cutting the tape into lengths.

39. In a machine of the class described, the combination of tape feeding means, a grinding wheel adapted to operate on the tape as it moves through the machine, means for cutting the tape into uniform lengths, and means for automatically placing said lengths into containers.

40. In a machine of the class described, the combination of tape feeding means, a grinding wheel adapted to operate on the tape as it moves through the machine, means for cutting the tape into uniform lengths, and means for automatically placing each length into a separate container.

41. In a machine of the class described, the combination of tape feeding means, a grinding wheel adapted to operate on the tape as it moves through the machine, means for cutting the tape into uniform lengths, and means for automatically coiling and placing said lengths into containers.

42. In a machine of the class described, the combination of tape feeding means, a grinding wheel adapted to operate on the tape as it moves through the machine, means for cutting the tape into uniform lengths, and means for automatically coiling and placing each length into a separate container.

43. In a machine of the class described, the combination of means for continuously feeding a tape, a grinding wheel adapted to operate on the tape as it moves through the machine, means whereby the free end of the tape is arranged in a container, and means for cutting off the end portion of the tape after the free end thereof is arranged in the container.

44. In a machine of the class described, the combination of means for continuously feeding a tape through the machine, means for sharpening the edge of the tape, means for coiling the tape, means for placing a container over the end of the tape being coiled, and means for cutting the tape after the placing of the container.

45. In a machine of the class described, the combination of means for feeding a tape through the machine, means for sharpening the edge of the tape, a plurality of means for coiling the tape, means for cutting the tape into uniform lengths, and means operating in timed relation to said cutting means for moving said coiling means successively into position to receive the end of the tape.

46. In a machine of the class described, the combination of means for feeding a tape through the machine, means for sharpening the edge of the tape, a wheel, a plurality of means carried by said wheel for coiling the tape, means for cutting the tape into uniform lengths, and means operating in timed relation to said cutting means for moving said wheel to bring said coiling means successively into position to receive the end of the tape.

47. In a machine of the class described, the combination of means for feeding a tape through the machine, means for sharpening the edge of the tape, means for coiling the tape, means for cutting the tape into uniform lengths, and means for delivering containers to said coiling means in timed relation to said cutting means.

48. In a machine of the class described, the combination of means for feeding a tape through the machine, means for sharpening the edge of the tape, a plurality of means for coiling the tape, a container magazine, and means for delivering containers successively to said coiling means.

49. In a machine of the class described, the combination of means for feeding a tape through the machine, means for sharpening the edge of the tape, a plurality of means for coiling the tape, means for cutting the tape into uniform lengths, and means operating in timed relation to said cutting means for successively placing said coiling means in position to coil the separate length of tape.

50. In a machine of the class described, the combination of means for feeding a tape through the machine, means for sharpening the edge of the tape, a plurality of means for coiling the tape, means for cutting the tape into uniform lengths, means operating in timed relation to said cutting means for successively placing said coiling means in position to coil the separate lengths of tape, and means for delivering containers, for the coils, to the coiling means.

51. In a machine of the class described, the combination of means for feeding a tape through the machine, means for sharpening the edge of the tape, a plurality of means for coiling the tape, means for cutting the tape into uniform lengths, means operating in timed relation to said cutting means for successively placing said coiling means in position to coil the separate lengths of tape, and means for delivering containers, for the coils, to the coiling means, after the latter have been placed in position to coil the tape.

52. In a machine of the class described, the combination of means for feeding a tape through the machine, means for sharpening the edge of the tape, a plurality of means for coiling the tape, means for cutting the tape into uniform lengths, means operating in timed relation to said cutting means for successively placing said coiling means in position to coil the separate lengths of tape, and means for delivering containers for the coils to the coiling means while the latter are operating.

53. In a machine of the class described, the combination of means for feeding a tape through the machine, means for sharpening the edge of the tape, a plurality of intermittently operating means for coiling the tape, means for cutting the tape into uniform lengths, means for successively placing said coiling means in position to coil the separate lengths of tape, means for delivering containers, for the coils, to the coiling means, and means for discharging the containers, with the coils therein, from said coiling means.

54. In a machine of the class described, the combination of means for feeding a tape through the machine, means for sharpening the edge of the tape, a wheel, a plurality of means, carried by said wheel, for coiling the tape, means for intermittently rotating said wheel to place said coiling means in position to coil the tape, means for delivering containers to the coiling means while the latter are operating, and means for discharging the containers, with the coils therein, from said coiling means while the latter are inoperative.

In testimony whereof I affix my signature in presence of two witnesses.

EUGENE G. MERGENTHALER.

Witnesses:
FERDINAND F. DENHARD,
EMIL R. DENHARD.